US007291069B2

(12) United States Patent
Michaelson et al.

(10) Patent No.: US 7,291,069 B2
(45) Date of Patent: Nov. 6, 2007

(54) CENTRAL DETERMINATION GAMING SYSTEM WITH A GAME OUTCOME GENERATED BY A GAMING TERMINAL AND APPROVED BY A CENTRAL CONTROLLER

(75) Inventors: Richard E. Michaelson, Reno, NV (US); Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 784 days.

(21) Appl. No.: 10/383,423

(22) Filed: Mar. 6, 2003

(65) Prior Publication Data

US 2004/0176167 A1 Sep. 9, 2004

(51) Int. Cl.

*G06F 17/00* (2006.01)
*G06F 19/00* (2006.01)
*A63F 9/24* (2006.01)

(52) U.S. Cl. .......................................... 463/42; 463/26

(58) Field of Classification Search .................... 463/1, 463/9, 12, 13, 19–27, 40–42; 273/138.1, 273/138.2, 236, 237, 459–461
See application file for complete search history.

(56) References Cited

U.S. PATENT DOCUMENTS 4,157,829 A 6/1979 Goldman et al.
4,332,389 A 6/1982 Loyd et al.
4,335,809 A 6/1982 Wain
4,339,798 A 7/1982 Hedges et al.
4,365,810 A 12/1982 Richardson
4,373,726 A 2/1983 Churchill et al.
4,448,419 A 5/1984 Telnaes
4,455,025 A 6/1984 Itkis
4,467,424 A 8/1984 Hedges et al.
4,494,197 A 1/1985 Troy et al.
4,527,798 A 7/1985 Siekierski et al.
4,582,324 A 4/1986 Koza et al.
4,624,462 A 11/1986 Itkis
4,636,951 A 1/1987 Harlick
4,652,998 A 3/1987 Koza et al.
4,669,730 A 6/1987 Small
4,679,143 A 7/1987 Hagiwara (Continued)

FOREIGN PATENT DOCUMENTS

GB 2 374 294 A 10/2002

(Continued)

*Primary Examiner*—Robert E Pezzuto
(74) *Attorney, Agent, or Firm*—Bell, Boyd & Lloyd LLP

(57) ABSTRACT

A central determination gaming system including a plurality of gaming terminals in communication with a central controller. In one embodiment, upon initiation of a game at one of the gaming terminals, the gaming terminal randomly generates a proposed game outcome. The proposed game outcome is communicated to the central controller. The central controller determines if a pool of predetermined game outcomes includes the proposed game outcome. If the pool includes the proposed game outcome, the central controller authorizes the proposed game outcome to be provided to the player, flags the authorized game outcome from further authorizations and communicates the authorized game outcome to the gaming terminal. The gaming terminal then provides the authorized game outcome to the player. If the pool does not include the proposed game outcome, the central controller discards the proposed game outcome and instructs the gaming terminal to generate another proposed game outcome for authorization.

61 Claims, 7 Drawing Sheets

U.S. PATENT DOCUMENTS

| | | | |
|---|---|---|---|
| 4,689,742 A | | 8/1987 | Troy et al. |
| 4,798,387 A | | 1/1989 | Richardson |
| 4,805,907 A | | 2/1989 | Hagiwara |
| 4,815,741 A | | 3/1989 | Small |
| 4,817,951 A | | 4/1989 | Crouch et al. |
| 4,842,278 A | | 6/1989 | Markowicz |
| 4,848,771 A | | 7/1989 | Richardson |
| 4,856,787 A | | 8/1989 | Itkis |
| 4,880,237 A | | 11/1989 | Kishishita |
| 4,882,473 A | | 11/1989 | Bergeron et al. |
| 4,982,337 A | | 1/1991 | Burr et al. |
| 5,007,649 A | | 4/1991 | Richardson |
| 5,042,809 A | | 8/1991 | Richardson |
| 5,092,598 A | | 3/1992 | Kamille |
| 5,100,139 A | | 3/1992 | Di Bella |
| 5,119,295 A | | 6/1992 | Kapur |
| 5,158,293 A | | 10/1992 | Mullins |
| 5,223,698 A | | 6/1993 | Kapur |
| 5,265,874 A | | 11/1993 | Dickinson et al. |
| 5,275,400 A | | 1/1994 | Weingardt et al. |
| 5,276,312 A | | 1/1994 | McCarthy |
| 5,282,620 A | | 2/1994 | Keesee |
| 5,297,802 A | | 3/1994 | Pocock et al. |
| 5,324,033 A | * | 6/1994 | Fenton, Jr. .................. 473/305 |
| 5,324,035 A | | 6/1994 | Morris et al. |
| 5,326,104 A | | 7/1994 | Pease et al. |
| 5,348,299 A | | 9/1994 | Clapper, Jr. |
| 5,351,970 A | | 10/1994 | Fioretti |
| 5,377,975 A | | 1/1995 | Clapper, Jr. |
| 5,393,061 A | | 2/1995 | Manship et al. |
| 5,398,932 A | | 3/1995 | Eberhardt et al. |
| 5,407,199 A | | 4/1995 | Gumina |
| 5,476,259 A | | 12/1995 | Weingardt |
| 5,487,544 A | | 1/1996 | Clapper, Jr. |
| 5,536,008 A | | 7/1996 | Clapper, Jr. |
| 5,542,669 A | | 8/1996 | Charron et al. |
| 5,562,284 A | | 10/1996 | Stevens |
| 5,564,701 A | | 10/1996 | Dettor |
| 5,580,311 A | | 12/1996 | Haste, III |
| 5,586,937 A | | 12/1996 | Menashe |
| 5,595,538 A | | 1/1997 | Haste, III |
| 5,609,337 A | | 3/1997 | Clapper, Jr. |
| 5,628,684 A | | 5/1997 | Bouedec |
| 5,630,754 A | | 5/1997 | Rebane |
| 5,645,485 A | | 7/1997 | Clapper, Jr. |
| 5,657,899 A | | 8/1997 | Stoken |
| 5,674,128 A | | 10/1997 | Holch et al. |
| 5,697,843 A | | 12/1997 | Manship et al. |
| 5,702,304 A | * | 12/1997 | Acres et al. .................. 463/29 |
| 5,720,483 A | | 2/1998 | Trinh |
| 5,735,432 A | | 4/1998 | Stoken et al. |
| 5,749,784 A | | 5/1998 | Clapper, Jr. |
| 5,779,545 A | | 7/1998 | Berg et al. |
| 5,779,547 A | | 7/1998 | SoRelle et al. |
| 5,800,269 A | | 9/1998 | Holch et al. |
| 5,810,664 A | | 9/1998 | Clapper, Jr. |
| 5,830,067 A | | 11/1998 | Graves et al. |
| 5,855,515 A | | 1/1999 | Pease et al. |
| 5,871,398 A | | 2/1999 | Schneier et al. |
| 5,876,283 A | | 3/1999 | Parra et al. |
| 5,882,260 A | | 3/1999 | Marks et al. |
| 5,915,588 A | | 6/1999 | Stoken et al. |
| 5,928,082 A | | 7/1999 | Clapper, Jr. |
| 5,941,771 A | | 8/1999 | Haste, III |
| 5,944,606 A | | 8/1999 | Gerow |
| 5,949,042 A | | 9/1999 | Dietz, II et al. |
| 5,954,582 A | | 9/1999 | Zach |
| 5,970,143 A | | 10/1999 | Schneier et al. |
| 5,980,385 A | | 11/1999 | Clapper, Jr. |
| 5,984,779 A | | 11/1999 | Bridgeman et al. |
| 6,012,984 A | | 1/2000 | Roseman |
| 6,017,032 A | | 1/2000 | Grippo et al. |
| 6,024,640 A | | 2/2000 | Walker et al. |
| 6,056,289 A | | 5/2000 | Clapper, Jr. |
| 6,062,981 A | | 5/2000 | Luciano, Jr. |
| 6,079,711 A | | 6/2000 | Wei et al. |
| 6,089,982 A | | 7/2000 | Holch et al. |
| 6,093,100 A | | 7/2000 | Singer et al. |
| 6,099,408 A | | 8/2000 | Schneier et al. |
| 6,117,009 A | | 9/2000 | Yoseloff |
| 6,120,024 A | | 9/2000 | Lind |
| 6,146,272 A | | 11/2000 | Walker et al. |
| 6,155,925 A | | 12/2000 | Giobbi et al. |
| 6,159,095 A | | 12/2000 | Frohm et al. |
| 6,168,521 B1 | | 1/2001 | Luciano et al. |
| 6,174,233 B1 | | 1/2001 | Sunaga et al. |
| 6,183,361 B1 | | 2/2001 | Cummings et al. |
| 6,210,275 B1 | | 4/2001 | Olsen |
| 6,210,276 B1 | | 4/2001 | Mullins |
| 6,217,448 B1 | | 4/2001 | Olsen |
| 6,220,961 B1 | | 4/2001 | Keane et al. |
| 6,234,897 B1 | * | 5/2001 | Frohm et al. ................. 463/20 |
| 6,241,606 B1 | | 6/2001 | Riendeau et al. |
| 6,250,685 B1 | | 6/2001 | Walker et al. |
| 6,254,480 B1 | | 7/2001 | Zach |
| 6,273,820 B1 | | 8/2001 | Haste, III |
| 6,280,325 B1 | | 8/2001 | Fisk |
| 6,280,328 B1 | | 8/2001 | Holch et al. |
| 6,302,791 B1 | | 10/2001 | Frohm et al. |
| 6,306,038 B1 | | 10/2001 | Graves et al. |
| 6,309,298 B1 | | 10/2001 | Gerow |
| 6,315,289 B1 | | 11/2001 | Sakamoto et al. |
| 6,319,125 B1 | * | 11/2001 | Acres .......................... 463/25 |
| 6,325,716 B1 | | 12/2001 | Walker et al. |
| 6,358,150 B1 | | 3/2002 | Mir et al. |
| 6,358,151 B1 | | 3/2002 | Enzminger et al. |
| 6,368,218 B2 | | 4/2002 | Angell, Jr. |
| 6,386,977 B1 | | 5/2002 | Hole |
| 6,402,614 B1 | | 6/2002 | Schneier et al. |
| 6,419,583 B1 | * | 7/2002 | Crumby et al. ............... 463/42 |
| 6,425,824 B1 | * | 7/2002 | Baerlocher et al. ........... 463/16 |
| 6,443,837 B1 | | 9/2002 | Jaffe et al. |
| 6,447,395 B1 | | 9/2002 | Stevens |
| 6,450,885 B2 | | 9/2002 | Schneier et al. |
| 6,454,648 B1 | | 9/2002 | Kelly et al. |
| RE37,885 E | | 10/2002 | Acres et al. |
| 6,471,591 B1 | | 10/2002 | Crumby |
| 6,475,086 B2 | | 11/2002 | Zach |
| 6,508,711 B1 | | 1/2003 | Ono |
| 6,524,184 B1 | | 2/2003 | Lind et al. |
| 6,524,185 B2 | | 2/2003 | Lind |
| 6,527,638 B1 | | 3/2003 | Walker et al. |
| 6,533,664 B1 | | 3/2003 | Crumby |
| 6,537,150 B1 | * | 3/2003 | Luciano et al. ............... 463/16 |
| 6,569,017 B2 | | 5/2003 | Enzminger et al. |
| 6,599,187 B2 | | 7/2003 | Gerow |
| 6,607,439 B2 | * | 8/2003 | Schneier et al. .............. 463/17 |
| 6,656,040 B1 | | 12/2003 | Brosnan et al. |
| 6,656,044 B1 | | 12/2003 | Lewis |
| 6,729,961 B1 | | 5/2004 | Millerschone |
| 6,749,500 B1 | | 6/2004 | Nelson et al. |
| 6,964,611 B2 | * | 11/2005 | Packes et al. ................. 463/40 |
| 6,988,946 B2 | * | 1/2006 | Michaelson et al. .......... 463/17 |
| 2002/0010013 A1 | | 1/2002 | Walker et al. |
| 2002/0039917 A1 | | 4/2002 | Armstrong et al. |
| 2002/0072404 A1 | | 6/2002 | Gerow |
| 2002/0077173 A1 | | 6/2002 | Luciano et al. |
| 2002/0077174 A1 | | 6/2002 | Luciano et al. |
| 2002/0082070 A1 | | 6/2002 | Macke et al. |
| 2002/0082071 A1 | | 6/2002 | Riendeau et al. |
| 2002/0082085 A1 | | 6/2002 | Osterer |
| 2002/0090986 A1 | | 7/2002 | Cote et al. |
| 2002/0094871 A1 | | 7/2002 | Luciano et al. |
| 2002/0098882 A1 | | 7/2002 | Lind et al. |

| | | | |
|---|---|---|---|
| 2002/0098883 | A1 | 7/2002 | Packes, Jr. et al. |
| 2002/0111207 | A1 | 8/2002 | Lind et al. |
| 2002/0111214 | A1 | 8/2002 | Lind et al. |
| 2002/0113369 | A1 | 8/2002 | Weingardt |
| 2002/0132661 | A1 | 9/2002 | Lind et al. |
| 2002/0132666 | A1 | 9/2002 | Lind et al. |
| 2002/0169018 | A1 | 11/2002 | Schneier et al. |
| 2003/0100371 | A1 | 5/2003 | Gatto et al. |
| 2003/0100372 | A1 | 5/2003 | Gatto et al. |
| 2003/0125101 | A1 | 7/2003 | Campo |
| 2003/0181231 | A1 | 9/2003 | Vancura et al. |
| 2003/0193136 | A1 | 10/2003 | Walker et al. |
| 2003/0211884 | A1 | 11/2003 | Gauselmann |

FOREIGN PATENT DOCUMENTS

| | | |
|---|---|---|
| WO | WO 00/67424 | 11/2000 |
| WO | WO 02/097749 A2 | 12/2002 |

* cited by examiner

CENTRAL DETERMINATION GAMING SYSTEM WITH A GAME OUTCOME GENERATED BY A GAMING TERMINAL AND APPROVED BY A CENTRAL CONTROLLER

CROSS-REFERENCE TO RELATED APPLICATIONS

This application relates to the following commonly owned patent applications: "GAMING SYSTEM WITH INDIVIDUALIZED CENTRALLY GENERATED RANDOM NUMBER GENERATOR SEEDS," Ser. No. 09/519,947, now U.S. Pat. No. 6,533,664; "GAMING DEVICE INCLUDING OUTCOME POOLS FOR PROVIDING GAME OUTCOMES," Ser. No. 10/261,744, "APPARATUS AND METHOD FOR GENERATING A POOL OF SEEDS FOR A CENTRAL DETERMINATION GAMING SYSTEM," Ser. No. 10/371,722, "CENTRAL DETERMINATION GAMING SYSTEM WITH A CENTRAL CONTROLLER PROVIDING A GAME OUTCOME AND A GAMING TERMINAL DETERMINING A PRESENTATION OF THE PROVIDED GAME OUTCOME," Ser. No. 10/371,723, "CENTRAL DETERMINATION GAMING SYSTEM WHERE THE SAME SEED IS USED TO GENERATE THE OUTCOMES FOR A PRIMARY GAME AND A SECONDARY GAME," Ser. No. 10/371,958, "CENTRAL DETERMINATION GAMING SYSTEM WHICH PROVIDES A PLAYER A CHOICE IN OUTCOMES," Ser. No. 10/442,318, "CENTRAL DETERMINATION GAMING SYSTEM WITH A GAMING TERMINAL ASSISTING THE CENTRAL CONTROLLER IN THE GENERATION OF A GAME OUTCOME," Ser. No. 10/431,755, and "CENTRAL DETERMINATION SYSTEM WITH A KENO GAME," Ser. No. 10/601,482.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a central determination gaming system, and more particularly to a central determination gaming system with a game outcome generated by a gaming terminal and approved by a central controller. The majority of the contemporary wagering gaming devices or gaming terminals, such as slot machines, randomly generate awards and other outcomes. Such gaming devices typically include a relatively low probability associated with obtaining the highest award, relatively medium probabilities associated with obtaining medium range awards and relatively higher probabilities associated with obtaining low range awards. These gaming devices also include probabilities associated with obtaining losses or no award at all. The probabilities of obtaining the awards and the amount of the awards determine the average expected pay out percentage of these wagering gaming devices. Because the outcomes of these gaming devices are completely randomly determined, there is no certainty that a player will ever obtain any particular award. That is, no matter how many times a player plays the game, since the gaming device generates outcomes randomly or completely based upon a probability calculation, there is no certainty that the game will ever provide the player with a rare outcome, such as a jackpot award, or any other specific value for that matter. On the other hand, due to the random determination, the gaming device can provide the rare outcomes, such as jackpot awards, numerous times in a small number of plays. For example, a probability-based $1 slot machine gaming device may be programmed to payback 95% of all wagers placed with a 1% chance of generating a $10 win outcome, a 5% chance of generating a $5win outcome, a 10% chance of generating a $2 win outcome, a 40% chance of generating a $1 win outcome and a 44% chance of generating a $0 loss outcome. However, when one hundred game outcomes are generated by the probability-based slot machine gaming device, the actual payback may be 137% of all wagers placed and the actual generated outcomes may be six $10 win outcomes, one $5 win outcome, eighteen $2 win outcomes, thirty-six $1 win outcomes and thirty-nine $0 loss outcomes.

This uncertainty is faced by players and casinos or other gaming establishments. For example, certain casinos prefer that a relatively high number of players hit low awards while a relatively low number of players hit high awards. When players hit high awards periodically, casinos attract more players, because of the positive publicity large wins generate. By using desired payback percentages or probabilities, the casinos can also expect to make a certain level of profit. The random determinations can, however, unexpectedly cause casinos to suffer a loss or, on the other hand, to reap great profit in the short run and lose business in the long run due to a reputation for only paying out low awards.

Regulatory bodies in certain jurisdictions do not permit the use of probability-based gaming devices in-part for these reasons. These regulatory bodies permit the use of wagering gaming devices which are guaranteed to provide certain or definite awards, so that, for example, a certain number of wins is guaranteed and the overall amount paid back to players is guaranteed. That is, the payback percentage is fixed and not an average expected amount. One type of gaming device which complies with this requirement is an instant-type lottery gaming device. An instant-type lottery gaming device includes a finite pool or set of electronic tickets with each electronic ticket assigned to a predetermined outcome. Alternatively, each electronic ticket could be assigned to a random number or game play seed. Each seed is deterministic of a predetermined game outcome. That is, the gaming device utilizes the random number or game play seed in a random number generating algorithm to generate at least one and preferably a plurality of random numbers that the gaming device then uses to determine and provide the predetermined game outcome. In an instant-type lottery gaming device, as the predetermined outcome for each electronic ticket is revealed to a player on the gaming device, the ticket is flagged or marked as used in the finite pool of electronic tickets. Once flagged, a ticket is prevented from being used again to determine another game outcome. This type of gaming device provides players with all of the available outcomes over the course of the play cycle and guarantees the actual wins and losses.

Since an instant-type lottery gaming device has a finite pool of predetermined win/loss outcomes, it is possible to configure the pool to specific conditions or criteria requested by the casino or gaming establishment. An example of these conditions or criteria are the number of tickets included in the pool and the exact payback percentage or payback sum for the pool as a whole. The payback percentage or sum represents the guaranteed payout for the entire pool of predetermined outcomes. Other examples of conditions or criteria are what prizes will be awarded and the frequency of winning outcome tickets amongst the total number of tickets for the pool. For example, if a predetermined pool includes twenty $1 tickets and the pool has a payback sum of $10, then the pool might consist of one $5 win outcome, one $2 win outcome, three $1 win outcomes and fifteen $0 loss outcomes and may be represented as the following outcomes: 5, 2, 1, 1, 1, 0, 0, 0, 0, 0, 0, 0, 0, 0, 0, 0, 0, 0, 0, 0. It should be appreciated that the above described pool of twenty tickets is for illustration purposes only and a pool could include any suitable desired number of tickets including a large number such as one million or more.

Additionally, even though a pool may include more than one of the same game outcome, such as more than one lose game outcomes in the pool, the presentation to the player, such as the reel symbol combination in a slot machine, cards dealt in a card game and the like, is preferably varied for each sequential game outcome. For example, in the twenty ticket pool described above, while three game outcomes may each determine a win game outcome with a value of $1, each game outcome will be preferably presented to the player as a multiple different or all different combinations of reel symbols in a slot machine game. This provides increased excitement for the player because the player is continuously presented with different combinations of reel symbols.

Central determination gaming systems are also generally known. A central determination gaming system provides a plurality of individual gaming terminals or devices, located in a gaming establishment, such as a casino, coupled by one or more communication links, to a central processor or computing system. When a player plays a game on one of the gaming devices a game outcome is determined at the central processor based on probability data. The determined game outcome is communicated from the central system to the individual gaming device and then provided to the player. It should be appreciated that one central processor may continuously determine the game outcomes for hundreds or thousands of individual gaming devices at once.

In order to comply with the above mentioned regulatory rules that do not permit the use of gaming devices or terminals that provide probability based game outcomes, central determination gaming systems have been implemented wherein the central system maintains one or more predetermined pools or sets of game outcomes. Each game outcome in each pool includes a game outcome component (i.e., a win, a lose, a secondary game trigger or other suitable outcome) with an associated value or payout amount, if any, and a game presentation component (i.e., how the game outcome is displayed or presented to the player). In these systems, when a player makes a wager on one of the gaming devices, the central system selects a game outcome from a pool of game outcomes and flags or marks the selected game outcome as used. Once a game outcome is used, it is prevented from further selection from the predetermined pool or set and cannot be selected by the central processor upon another wager. The selected game outcome is communicated to the individual gaming terminal. The individual gaming terminal displays or presents the game presentation component and provides the player the game outcome component with the associated value, if any, for the selected game outcome.

These systems of central production or control can assist a casino or other entity in maintaining appropriate records, controlling gaming, reducing and preventing cheating or electronic or other errors, reducing or eliminating win-loss volatility and the like. However, these systems also require a substantial amount of memory because the central controller must store a game outcome component and a game presentation component for each game outcome in each set or pool of predetermined game outcomes. Additionally, certain central determination gaming systems have been implemented wherein the central system maintains one or more predetermined pools or sets of random number or game play seeds. In these systems, the central processor selects a game play seed and the selected game play seed is communicated to an individual gaming terminal. The gaming terminal utilizes the communicated game play seed to determine the predetermined game outcome.

Gaming devices having a primary or base game and a secondary or a bonus game are also well known. A secondary or bonus game may be any type of suitable game, either similar to or completely different from the primary game, which is entered upon the occurrence of a triggering event or a selected outcome in the primary game. The secondary or bonus game enables the player to obtain a prize or payout in addition to the prize or payout, if any, obtained from the primary game. A secondary or bonus game may produce a significantly higher level of player excitement than a primary game alone because it provides a greater expectation of winning than the primary game and is accompanied with more attractive or unusual features than the primary game.

SUMMARY OF THE INVENTION

The present invention relates to a central determination gaming system with a game outcome generated by a gaming terminal and approved by a central controller. The present invention includes a central controller and a plurality of gaming terminals in communication with the central controller.

In one embodiment of the present invention, upon a player initiating a game at one of the plurality of gaming terminals, the gaming terminal randomly generates a proposed game outcome. Each proposed game outcome includes an outcome component (i.e., a win, a lose, a secondary game trigger or other suitable outcome) with an associated value component or payout amount, if any. The proposed game outcome is determined identical to how a game outcome is determined in,a probability based gaming terminal such as conventional slot, poker and blackjack gaming machines. That is, the gaming terminal randomly generates a game outcome presentation, such as the reel symbol combination in a slot machine or the cards dealt in a card game. The proposed game outcome is then determined using the generated game outcome presentation and an appropriate pay table. For example, a slot machine gaming terminal may virtually use probability data to generate the stop positions of each reel and then use an appropriate pay table to determine the proposed game outcome that is associated with the combination of symbols on the stopped reels. This is done virtually and not shown to the player.

The proposed game outcome is communicated to the central controller or central processor before it is displayed to the player. In an alternative embodiment, only the value associated with the proposed game outcome is communicated to the central controller. It should be appreciated that the generated game outcome presentation is not communicated to the central controller, but is retained in the memory of the gaming terminal. The central controller determines if a pool of predetermined game outcomes includes at least one of the proposed game outcome. That is, the central controller accesses an appropriate pool of game outcomes for the specific game played and determines if the pool includes at least one of the proposed game outcome. Alternatively, the central controller determines if the pool of predetermined game outcomes includes at least one available game outcome based on the proposed game outcome. In the alternative embodiment wherein only the value associated with the proposed game outcome is communicated to the central controller, rather than storing each game outcome in the pool, the central controller stores the number of available game outcomes in the pool for each possible value. In this embodiment, the central controller determines if the number of available game outcomes in the pool with the same value as the value associated with the proposed game outcome is at least one.

If the pool of predetermined game outcomes includes at least one of the proposed game outcome (or the number of available game outcomes with the same value as the value associated with the proposed game outcome is at least one), the central controller authorizes the proposed game outcome to be provided to the player and marks or flags one of the available proposed game outcomes in the pool as used or unavailable. Once a proposed game outcome is marked or flagged it is prevented from a subsequent authorization. The central controller communicates the authorization of the proposed game outcome to the gaming terminal.

If the central controller determines that the pool of predetermined game outcomes does not include at least one of the proposed game outcome (or the number of available game outcomes with the same value as the value associated with the proposed game outcome is zero), for example, the proposed game outcome is flagged as previously authorized, the central controller discards the proposed game outcome. The central controller then instructs the gaming terminal to randomly generate another proposed game outcome. In such case, the gaming terminal discards the retained proposed game outcome presentation and randomly generates another game outcome presentation. The gaming terminal then determines, according to an appropriate pay table, the associated proposed game outcome (again, identical to how a probability based gaming terminal generates a game outcome). This proposed game outcome is communicated to the central controller for authorization. This process is repeated as described above until the central controller authorizes a proposed game outcome.

In an alternative embodiment, if the central controller determines that the pool of predetermined game outcomes does not include at least one of the proposed game outcome, the central controller may access an additional pool of predetermined game outcomes for the specific game played. In this case, the central controller will determine if this additional pool of game outcomes includes at least one proposed game outcome for authorization as described above. In another embodiment, the central controller may access the additional pool of game outcomes after the pool currently in use does not include a predetermined number of proposed game outcomes.

Upon authorization, the gaming terminal displays or presents the randomly generated game outcome presentation and provides the authorized game outcome to the player. If the authorized game outcome is a win outcome or a lose outcome, the gaming terminal provides the associated value, if any, to the player and the game ends. If the authorized game outcome is a secondary game triggering outcome, the gaming terminal provides the associated value, if any, to the player and then enables the player to play a secondary or bonus game.

In an alternative embodiment, the gaming terminal retains each rejected or discarded game outcome in a cache or other memory device. That is, if the gaming terminal receives an instruction from the central controller to randomly generate another proposed game outcome, the previous proposed game outcome is stored in the cache of rejected proposed game outcomes. In this embodiment, prior to communicating the generated proposed game outcome to the central controller, the gaming terminal determines if the proposed game outcome is included in the cache of rejected proposed game outcomes. If the cache does include the proposed game outcome, the gaming terminal discards the proposed game outcome and randomly generates another proposed game outcome. If the cache does not include the proposed game outcome, the gaming terminal communicates the proposed game outcome to the central controller for authorization as described above. In this embodiment, the cache would be emptied when the central determination system accesses an additional pool (i.e., because a pool is empty or the pool currently in use does not include at least a proposed game outcome) and thus the central determination system would notify the gaming terminal of such additionally accessed pool.

In an alternative embodiment of the present invention, upon a player initiating a game at one of the plurality of gaming terminals, the gaming terminal randomly determines a set or plurality of proposed game outcomes. The set includes any suitable number of proposed game outcomes. Each game outcome in the set is determined identical to how a game outcome is, generated in a probability based gaming terminal as described above.

In this embodiment, the set of proposed game outcomes (or alternatively, the value associated with each proposed game outcome in the set of proposed game outcomes) are communicated to the central controller or processor. The central controller randomly or sequentially selects one of the proposed game outcomes from the communicated set. The central controller then determines if the pool of predetermined game outcomes includes at least one of the selected proposed game outcome. Alternatively, the central controller determines if a pool of predetermined game outcomes includes at least one available game outcome based on the selected proposed game outcome. In the alternative embodiment wherein only the values associated with the proposed game outcomes are communicated to the central controller, the central controller determines if the number of available game outcomes in the pool with the same value as the value associated with the selected proposed game outcome is at least one.

If the pool of predetermined game outcomes includes at least one of the selected proposed game outcome (or the number of available game outcomes with the same value as the value associated with the selected proposed game outcome is at least one), the central controller flags one of the selected proposed game outcomes in the pool as unavailable and authorizes the gaming terminal to provide the selected proposed game outcome to the player as described above. In this case, the non-selected proposed game outcomes in the set of proposed game outcomes are discarded.

If the central controller determines that the pool of predetermined game outcomes does not include at least one of the selected proposed game outcome (or the number of available game outcomes with the same value as the value associated with the selected proposed game outcome is zero), the central controller discards the selected proposed game outcome. If there is at least one unselected proposed game outcome remaining in the set, the central controller randomly selects another proposed game outcome from the set of proposed game outcomes. The central controller determines if the pool of predetermined game outcomes include at least one of this selected proposed game outcome. This process continues until the central controller selects a proposed game outcome from the set that is included in the pool of game outcomes. In this case, the central controller flags the selected proposed game outcome in the pool and authorizes the gaming terminal to provide the selected proposed game outcome to the player as described above.

If there are no proposed game outcomes remaining in the set of proposed game outcomes, the central controller instructs the gaming terminal to randomly generate another set of proposed game outcomes. This set of proposed game outcomes is communicated to the central controller for authorization. This process is repeated, as described above, until the central controller selects a proposed game outcome from the set and authorizes the gaming terminal to provide the selected proposed game outcome to the player.

In an alternative embodiment wherein the gaming terminal communicates a plurality of proposed game outcomes to the central controller, the central controller determines if the pool of predetermined game outcomes includes each communicated proposed game outcome. In this embodiment, each proposed game outcome that is included in the pool of predetermined game outcomes is authorized, flagged and then stored in a cache or other memory storage device of the central controller. Each proposed game outcome that is not included in the pool of predetermined game outcomes is discarded. The central controller then randomly selects one of the authorized game outcomes, removes the selected game outcome from the cache and communicates the selected authorized game outcome to the gaming terminal to be provided to the player. On the next or subsequent game play from the same gaming terminal or alternatively from another gaming terminal that uses the same pool of game outcomes, the gaming terminal does not determine and communicate a plurality of proposed game outcomes to the central controller, but rather the central controller randomly selects another game outcome from the cache of authorized game outcomes, removes the selected game outcome from the cache and communicates the selected authorized game outcome to the gaming terminal to be provided to the player. This process continues as described above until the cache of authorized game outcomes is empty at which time the central controller instructs the gaming terminal to randomly generate another plurality of proposed game outcomes to be communicated to the central controller as described above.

The present invention provides a number of advantages over existing central determination gaming systems. For example, since the gaming terminals of the present invention are generating game outcome presentations (that are used to determine the proposed game outcomes) in an identical manner as probability based gaming terminals, the presentation to the player is the exact same as playing a probability based gaming terminal. That is, the game outcomes are determined as in a probability based gaming terminal with the additional step (that is not displayed and undetectable by the player) of the central controller authorizing or double checking the availability of the proposed game outcome prior to providing the generated outcome to the player. For example, in a slot machine gaming terminal, in the amount of time the reels of a probability based slot machine spin, the present invention is operable to perform the functions described above, multiple times if necessary, in order to authorize a gaming terminal generated proposed game outcome.

Another advantage of the present invention is that even though the central controller maintains at least one pool of predetermined game outcomes (which guarantees a specific amount of actual wins and losses), since the gaming terminals are generating game outcome presentations (that are used to determine the proposed game outcomes) based on probabilities, over the course of the play cycle, the game outcomes generated from the plurality of gaming terminals in the central determination gaming system will mirror a network of probability based gaming terminals in a non-central determination gaming system. That is, the present invention provides the advantage of a network of contemporary gaming terminals that determine game outcomes based on probability data while also complying with certain jurisdictional regulations that require gaming terminals which are guaranteed to provide certain or definite awards.

Moreover, the present invention requires less memory at both the gaming terminal and the central controller than previous central determination gaming systems. That is, the central controller needs to store only the outcome component and/or the value component of each game outcome in each predetermined pool of game outcomes and not how each game outcome is presented to the player. Further reducing the memory requirements, the central controller may store only the number of available game outcomes in the pool for each possible value. Additionally, since the gaming terminal randomly generates each proposed game outcome identical to how a probability based gaming terminal generates game outcomes, existing probability based gaming terminals with a modified communication module can be implemented into the present invention.

Additional features and advantages of the present invention are described in, and will be apparent from, the following Detailed Description of the Invention and the figures.

DETAILED DESCRIPTION OF THE INVENTION

Figure 1A:
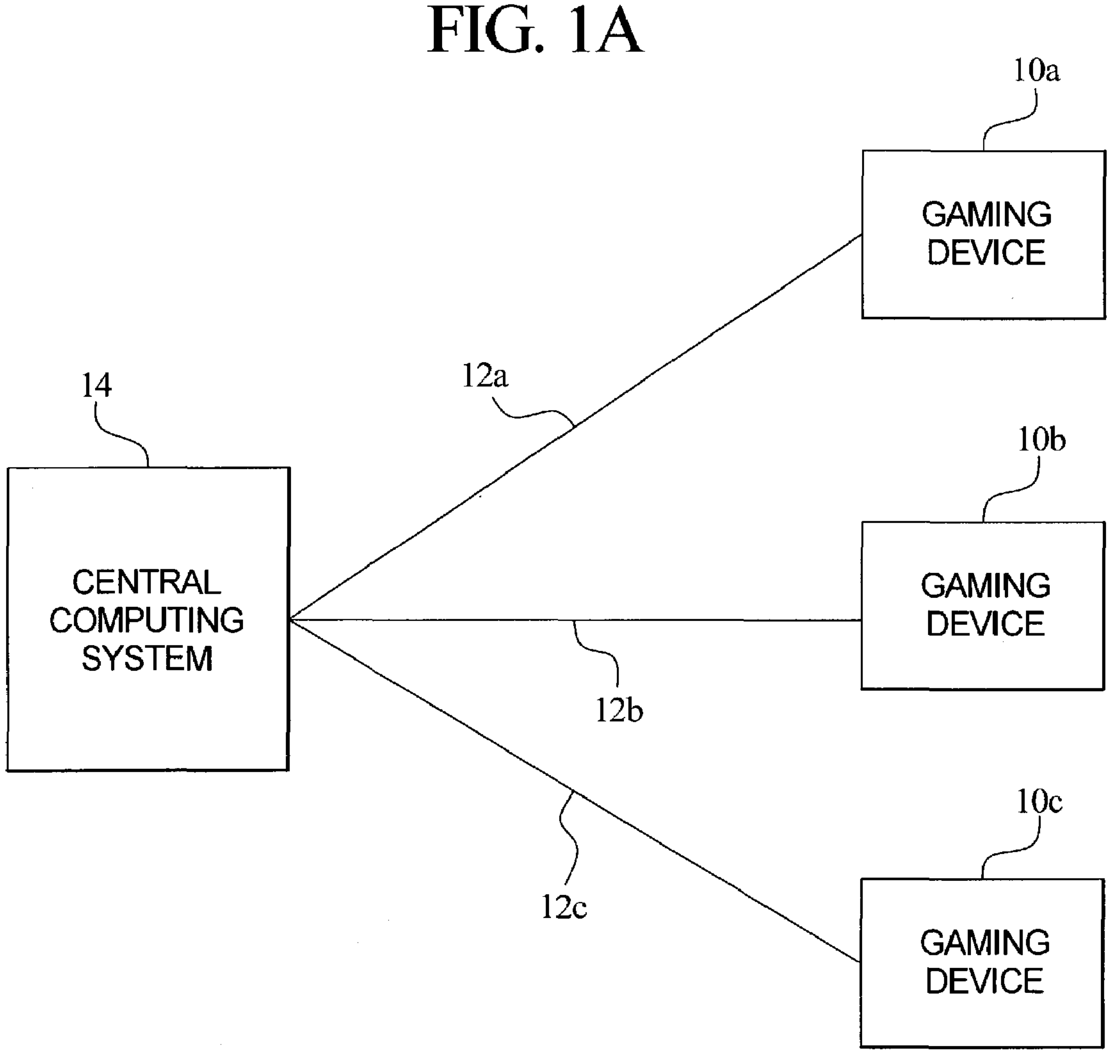
FIGS. 1A and 1B are schematic block diagrams illustrating the central controller and the individual gaming terminals in the central determination gaming system of the present invention.

Referring now to the drawings, as illustrated in FIG. 1A, one embodiment of the present invention includes a plurality of gaming devices or gaming terminals 10*a*, 10*b* and 10*c* located in a gaming establishment, such as a casino, coupled by one or more communication links 12*a*, 12*b* and 12*c* to a central controller or central processor 14. The communication links 12 can be any of a plurality of devices known to those of skill in the art for receiving data transmissions to and from the gaming terminal. The central processor maintains supervision over the entire network of gaming terminals.

In one embodiment, the central controller maintains at least one predetermined pool of predetermined game outcomes. Each predetermined game outcome includes an outcome component (i.e., a win, a lose outcome, a secondary game triggering outcome or other suitable outcome), and a value component or pay amount, if any. Each pool of predetermined game outcomes may include a plurality of each type of predetermined game outcome. For example, a pool of one thousand game outcomes may include hundreds of a lower range award and one or few of the highest award.

In one embodiment, the central processor maintains at least one pool of predetermined game outcomes for each type of game provided on the gaming terminals of the system. In an alternative embodiment, the central processor maintains a plurality of pools of predetermined game outcomes for each type of provided game. In another embodiment, the central processor maintains at least one pool of predetermined game outcomes for each denomination of each type of game provided on the gaming terminals of the system. Other suitable methods for storing the pool of predetermined game outcomes may be employed in accordance with the present invention.

Figure 1B:
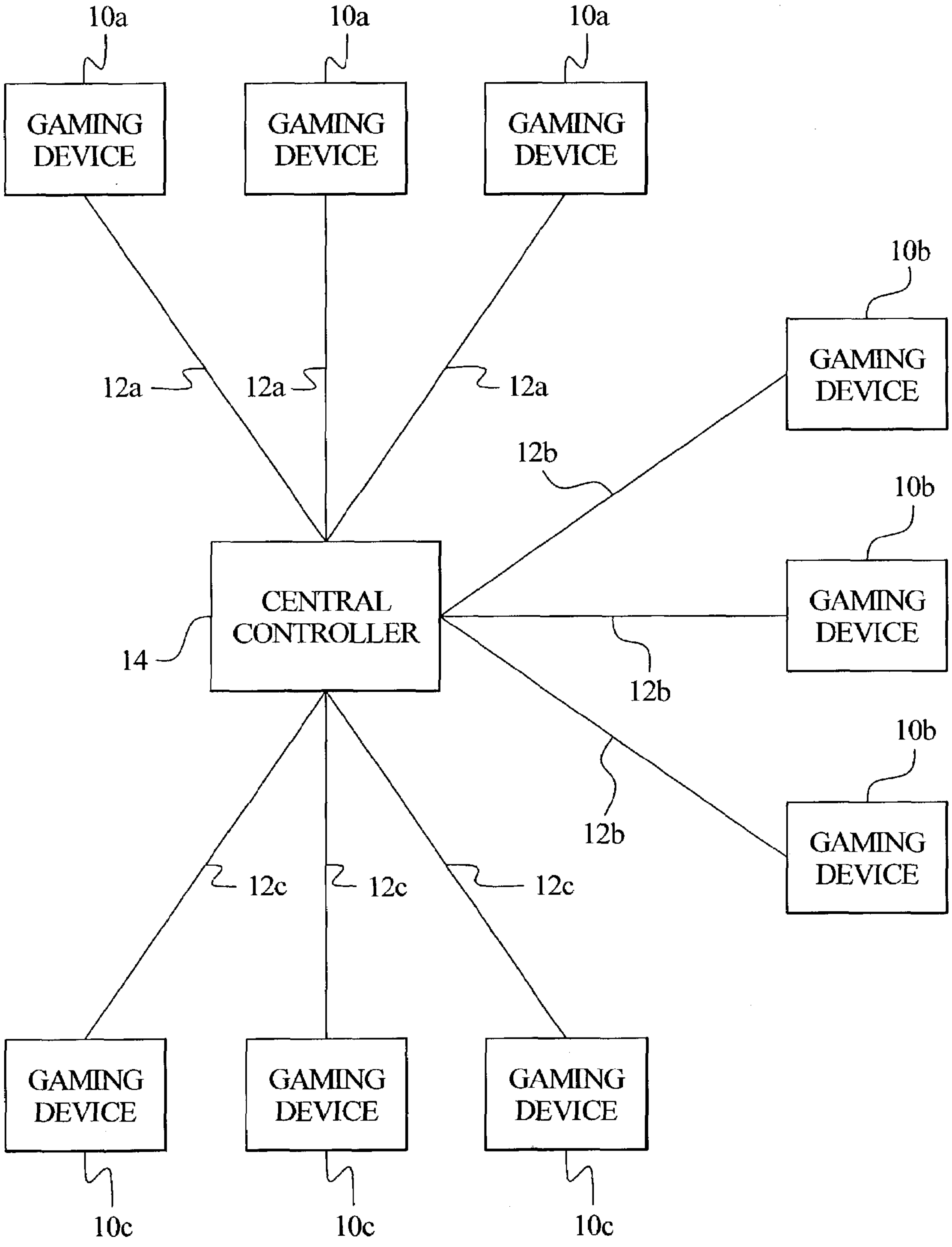

In one embodiment illustrated in FIG. 1B, a plurality of the gaming terminals are configured so that different gaming device or gaming terminals may be used to play different types of games. That is, the central controller 14 may be in communication via one of more communication links 12 with a plurality of gaming devices or gaming terminals 10*a* that are used for playing a slot machine style game, a different plurality of gaming devices or gaming terminals 10*b* that are used for playing a poker style game, a different plurality of gaming devices or gaming terminals 10*c* that are used for playing a blackjack style game, and the like. This embodiment enables the central controller to authorize every game outcome for game(s) played on every gaming terminal in the network of central determination gaming terminals. In an alternative embodiment, all of the gaming terminals which are coupled to the central processor are configured to play the same type of game. In another embodiment, a plurality of gaming terminals may each be configured for playing a plurality of different games.

Figure 2A:
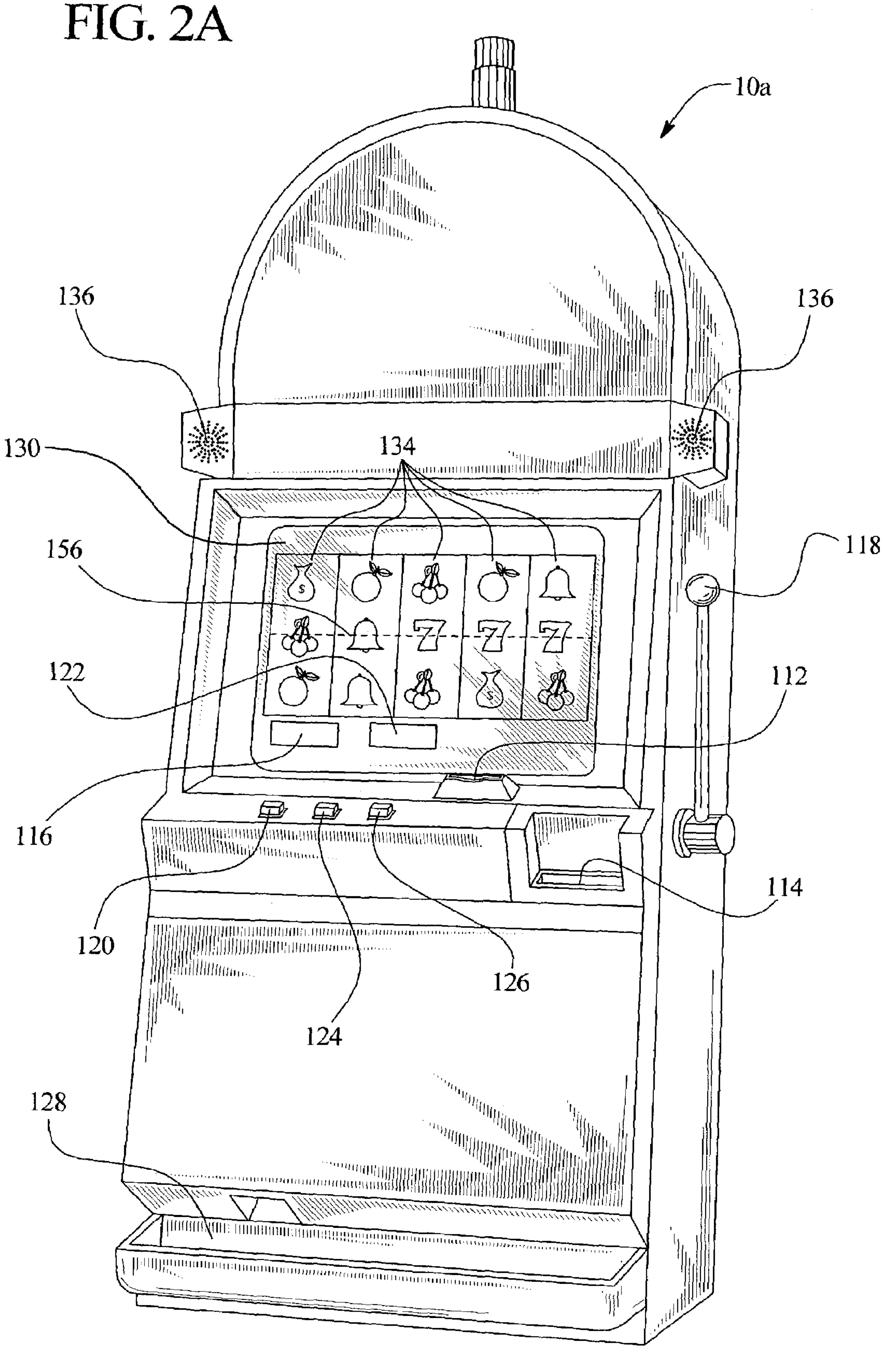
FIGS. 2A and 2B are perspective views of alternative embodiments of the gaming terminal of the present invention.
Figure 2B:
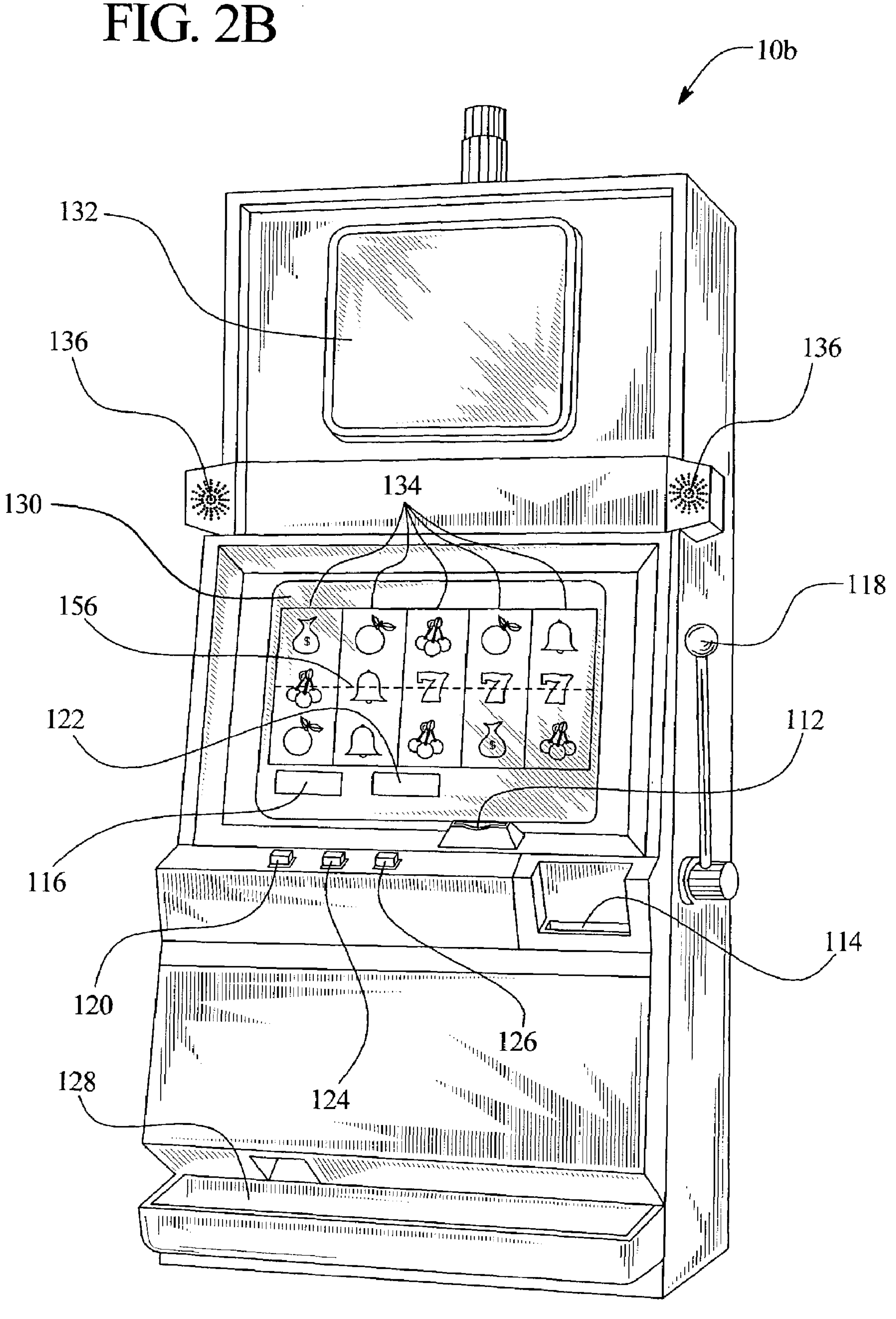

Two embodiments of the gaming terminal or gaming device of the present invention are shown in FIGS. 2A and 2B as gaming terminal 10*a* and gaming terminal 10*b*, respectively. Gaming terminal 10*a* and/or gaming terminal 10*b* are generally referred to herein as gaming terminal 10. Gaming terminal 10 is in one embodiment a slot machine having the controls, displays and features of a conventional slot machine. It is constructed so that a player can operate it while standing or sitting, and gaming terminal 10 is preferably mounted on a console. However, it should be appreciated that gaming terminal 10 can be constructed as a pub-style table-top game (not shown) which a player can operate preferably while sitting. Furthermore, gaming terminal 10 can be constructed with varying cabinet and display designs, as illustrated by the designs shown in FIGS. 2A and 2B.

As illustrated in FIGS. 2A and 2B, gaming terminal 10 includes a coin slot 112 and bill acceptor 114 where the player inserts money, coins or tokens. The player can place coins in the coin slot 112 or paper money in the bill acceptor 114. Other devices could be used for accepting payment such as readers or validators for credit cards or debit cards. When a player inserts money in gaming terminal 10, a number of credits corresponding to the amount deposited is shown in a credit display 116. After depositing the appropriate amount of money, a player can begin the game by pulling arm 118 or pushing play button 120. Play button 120 can be any play activator used by the player which starts any game or sequence of events in the gaming terminal.

As shown in FIGS. 2A and 2B, gaming terminal 10 also includes a bet display 122 and a bet one button 124. The player places a bet by pushing the bet one button 124. The player can increase the bet by one credit each time the player pushes the bet one button 124. When the player pushes the bet one button 124, the number of credits shown in the credit display 116 decreases by one, and the number of credits shown in the bet display 122 increases by one.

A player may cash out and thereby receive a number of coins corresponding to the number of remaining credits by pushing a cash out button 126. When the player cashes out, the player receives the coins in a coin payout tray 128. The gaming terminal 10 may employ other payout mechanisms such as credit slips redeemable by a cashier or electronically recordable cards which keep track of the player's credits.

Gaming terminal 10 also includes one or more display devices. The embodiment shown in FIG. 2A includes a central display device 130, and the alternative embodiment shown in FIG. 2B includes a central display device 130 as well as an upper display device 132. Gaming terminal 10 preferably displays a plurality of reels 134, preferably three to five reels 134 in mechanical or video form at one or more of the display devices. A display device can be any viewing surface such as glass, a video monitor or screen, a liquid crystal display or any other display mechanism. If the reels 134 are in video form, the display device for the video reels 134 is preferably a video monitor. It should be appreciated that the present invention can include one or more paylines displayed in a horizontal and/or diagonal fashion.

Each reel 134 displays a plurality of indicia such as bells, hearts, fruits, numbers, letters, bars or other images which preferably correspond to a theme associated with the gaming terminal 10. The symbols and indicia used on and in gaming terminal 10 may be in mechanical, electronic, electrical or video form. Furthermore, gaming terminal 10 preferably includes speakers 136 for making sounds or playing music.

Figure 3:
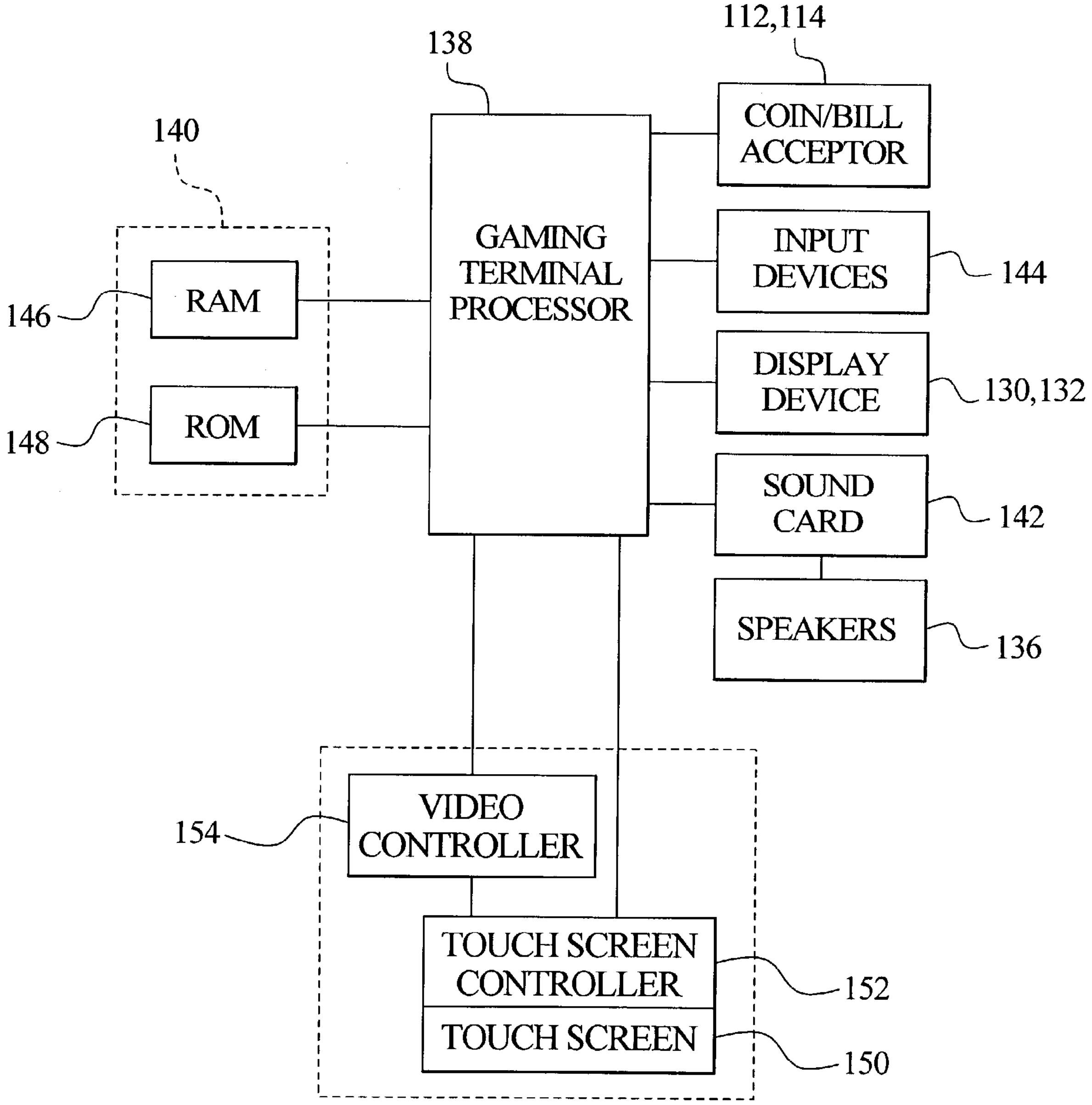
FIG. 3 is a schematic block diagram of an electronic configuration of one embodiment of the gaming terminal of the present invention.

As illustrated in FIG. 3, the general electronic configuration of gaming terminal 10 preferably includes: a processor 138; a memory device 140 for storing program code or other data; a central display device 130; an upper display device 132; a sound card 142; a plurality of speakers 136; and one or more input devices 144. The processor 138 is preferably a microprocessor or microcontroller-based platform which is capable of displaying images, symbols and other indicia such as images of people, characters, places, things and faces of cards. The memory device 140 can include random access memory (RAM) 146 for storing event data or other data generated or used during a particular game. The memory device 140 can also include read only memory (ROM) 148 for storing program code which controls the gaming terminal 10 so that it plays a particular game in accordance with applicable game rules and pay tables.

As illustrated in FIG. 3, the player preferably uses the input devices 144, such as pull arm 118, play button 120, the bet one button 124 and the cash out button 126 to input signals into gaming terminal 10. In certain instances it is preferable to use a touch screen 150 and an associated touch screen controller 152 instead of a conventional video monitor display device. Touch screen 150 and touch screen controller 152 are connected to a video controller 154 and processor 138. A player can make decisions and input signals into the gaming terminal 10 by touching touch screen 150 at the appropriate places. As further illustrated in FIG. 3, the processor 138 can be connected to coin slot 112 or bill acceptor 114. The processor 138 can be programmed to require a player to deposit a certain amount of money in order to start the game.

It should be appreciated that although a processor 138 and memory device 140 are preferable implementations of the present invention, the present invention can also be implemented using one or more application-specific integrated circuits (ASIC's) or other hard-wired devices, or using mechanical devices (collectively and/or alternatively referred to herein as a "processor"). Furthermore, although the processor 138 and memory device 140 preferably reside on each gaming terminal 10 unit, it is possible to provide some or all of their functions at a central location such as a network server for communication to a playing station such as over a local area network (LAN), wide area network (WAN), Internet connection, microwave link, and the like.

In addition to winning base game credits, the gaming terminal 10, including any of the base games disclosed above, also includes secondary or bonus games that give players the opportunity to win credits. The gaming terminal 10 preferably employs a video-based display device 130 or 132 for the secondary or bonus games. The secondary or bonus games include a program that automatically begins when the player achieves a qualifying condition or a secondary game triggering outcome in the primary or base game.

In the slot machine embodiment, the qualifying condition or a secondary game triggering outcome includes a particular symbol or symbol combination generated on a display device. As illustrated in the five reel slot game shown in FIGS. 1A and 1B, the qualifying condition or secondary game triggering outcome includes the number seven appearing on three adjacent reels 134 along a payline 156. It should be appreciated that the present invention includes one or more paylines, such as payline 156, wherein the paylines can be horizontal, diagonal or any combination thereof.

Figure 4:
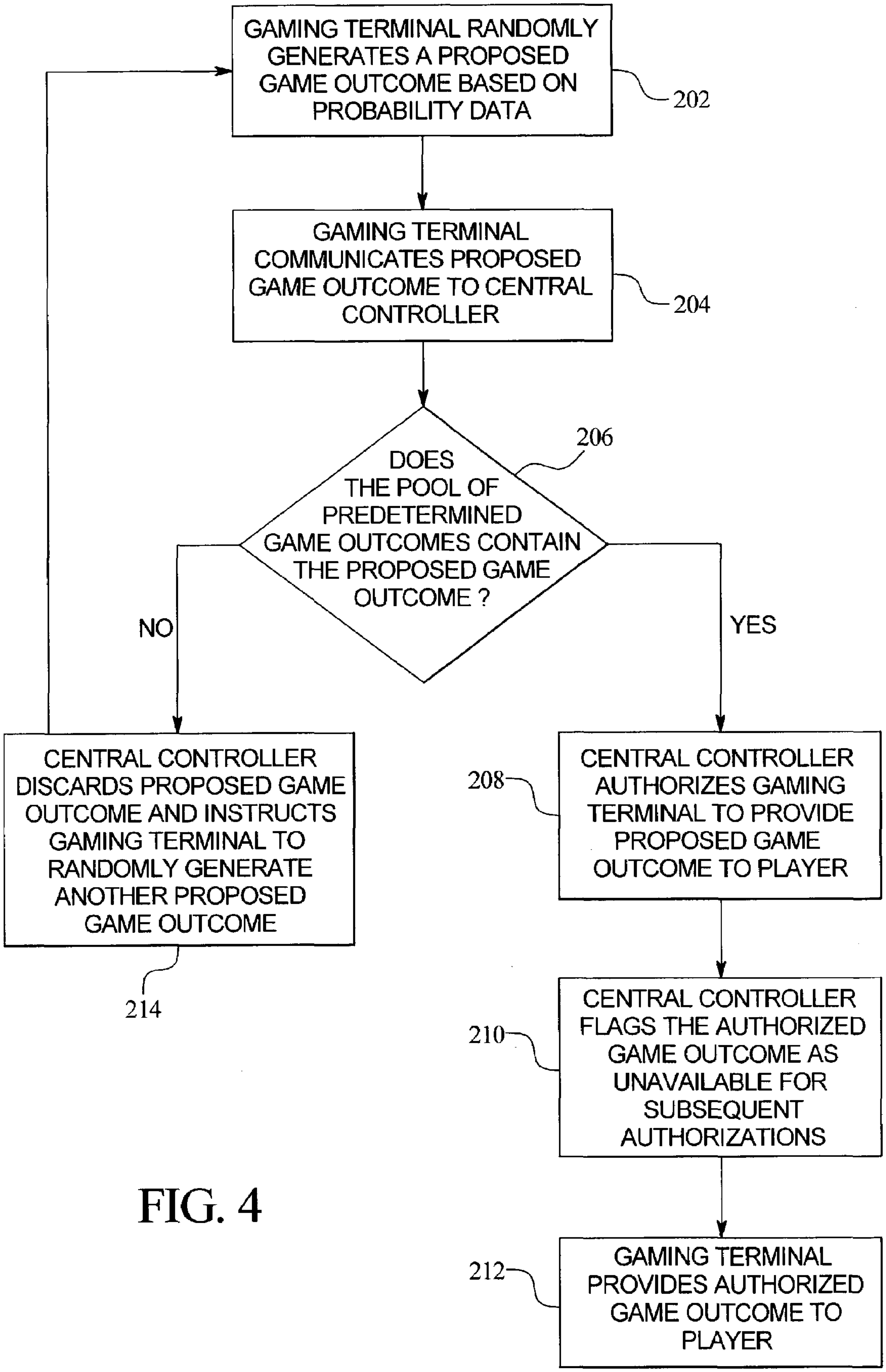
FIG. 4 is a schematic block diagram illustrating one embodiment of the present invention wherein the gaming terminal generates a proposed game outcome and the proposed game outcome is communicated to the central controller for authorization.

With reference to FIG. 4, in one embodiment of the present invention illustrating a slot machine style gaming terminal, to initiate operation of a primary or base game of the gaming terminal, the player must insert the appropriate amount of money or tokens and then pull the arm or push the play button. The reels will then begin to spin. As the wheels are spinning, the gaming terminal randomly generates a proposed game outcome as indicated in block 202. In an alternative embodiment, the gaming terminal randomly generates a proposed game outcome upon the player placing a wager in the gaming terminal.

The proposed game outcome is generated identical to how a game outcome is generated in a probability based gaming terminal such as conventional slot, poker and blackjack gaming machines. That is, the gaming terminal uses the same probability data as a probability based gaming terminal (i.e., the same random number generating algorithm or program code) to randomly generate a proposed game outcome presentation, such as the reel symbol combination in a slot machine or the cards dealt in a card game. For example, in a slot machine gaming terminal, a probability is associated with each symbol on each reel (i.e., a star symbol may have a one in twenty probability of occurring on each reel, thus there is a one in eight-thousand probability that three star symbols will occur on three reels). After the gaming terminal randomly generates a proposed game outcome presentation, with reference to an appropriate pay table or other stored data, the gaming terminal determines the proposed game outcome that is associated with the proposed game outcome presentation. Each proposed game outcome includes an outcome component (i.e., a win, a lose outcome, a secondary game triggering outcome or other suitable outcome), and an associated value component or pay amount, if any. For example, in the slot machine gaming terminal, the reel symbol combination of three star symbols may be associated with a win $5 game outcome. In an alternative embodiment, the gaming terminal uses probability data to randomly generate the proposed game outcome. In this embodiment, a game outcome presentation is associated with each proposed game outcome.

If the proposed game outcome is a secondary game triggering outcome, the gaming terminal randomly generates a proposed secondary game outcome presentation identical to how the primary game outcome presentation is generated. The gaming terminal then determines, with the use of an appropriate pay table or other stored data, the proposed secondary game outcome associated with the proposed secondary game outcome presentation. In this case, the gaming terminal combines the value associated with proposed secondary game triggering outcome, if any, and the value associated with the proposed secondary game outcome, if any, to determine the proposed game outcome that is communicated to the central controller for authorization, as described below. For example, if the gaming terminal determines that the secondary game triggering outcome has a value of $1 and the secondary game outcome has a value of $6, a proposed $7 win game outcome is communicated to the central controller for authorization.

The gaming terminal communicates the proposed game outcome to the central controller or central processor as indicated in block 204. It should be appreciated that the randomly generated proposed game outcome presentation is not communicated to the central controller, but is retained in the memory of the gaming terminal. In an alternative embodiment, only the value associated with the proposed game outcome is communicated to the central controller. The central controller determines if the pool of predetermined game outcomes includes at least one of the proposed game outcome as indicated by diamond 206. That is, the central controller determines if the pool includes at least one available game outcome that has an identical outcome component and an identical value component as the proposed game outcome. In the slot machine gaming terminal example used above, the central controller would determine if the pool of predetermined game outcomes includes at least one available win $5 game outcome. Alternatively, the central controller determines if the pool of predetermined game outcomes includes at least one available game outcome based on the proposed game outcome.

In the alternative embodiment wherein only the value associated with the proposed game outcome is communicated to the central controller, the central controller stores information or data regarding the number of available game outcomes in a pool for each possible value. For example, the central controller may store information or data that a pool has five available game outcomes with a value of $1000, fifty available game outcomes with a value of $100, five-hundred available game outcomes with a value of $10, five thousand available game outcomes with a value of $1, fifty thousand available game outcomes with a value of $1 and five-hundred thousand available game outcomes with a value of $0. In this embodiment, the central controller determines if the number of available game outcomes in the pool with the same value as the value associated with the proposed game outcome is at least one.

If the pool of predetermined game outcomes includes at least one of the proposed game outcome (or the number of available game outcomes with the same value as the value associated with the proposed game outcome is at least one), the central controller authorizes the gaming terminal to provide the proposed game outcome to the player as indicated in block 208. The central controller flags or marks the proposed game outcome in the pool as used or unavailable as indicated in block 210. Once a proposed game outcome is flagged or marked as used or authorized, it is prevented from subsequent authorization by the central controller. It should be appreciated that if the pool of game outcomes includes more than one of the same game outcome and one of the game outcomes is flagged or marked, the remaining same game outcomes are still available for subsequent authorization. In the slot machine example used above, if the pool of game outcomes includes thirty available win $5 game outcomes and the central controller flags or marks one of the available win $5 game outcomes, the flagged win $5 game outcome would no longer be available for a subsequent authorization but the remaining twenty-nine win $5 game outcomes would remain available for subsequent authorizations. In the embodiment wherein the central controller stores information or data regarding the number of available game outcomes in a pool for each possible value, upon the authorization of a proposed game outcome, the central controller reduces the number of available game outcome in the pool with the same value as the value associated with the proposed game outcome by one.

If the authorized game outcome is a win outcome or a lose outcome, the gaming terminal provides the authorized game outcome and the associated value, if any, to the player as indicated in block 212. The gaming terminal also presents or displays the randomly generated game outcome presentation (that is retained in the gaming terminal's memory) to the player. For example, in the slot machine gaming terminal used above, the gaming terminal provides the player a win $5 game outcome and displays a reel symbol combination of a star symbol on each reel.

If the authorized game outcome is a secondary game triggering outcome (not shown), the gaming terminal provides the associated value, if any, to the player, presents or displays the randomly generated game outcome presentation (that is retained in the gaming terminal's memory) and enables the player to play a secondary or bonus game. As described above, even though the gaming terminal enables the player to play a secondary or bonus game, the secondary game outcome has already been determined and authorized along with the primary game outcome. That is, the gaming terminal does not communicate with the central controller regarding the secondary game outcome but rather provides the prior authorized secondary game outcome and presents the prior generated secondary game outcome presentation to the player.

In an alternative embodiment, if a secondary or bonus game triggering outcome is provided to the player, the gaming terminal provides the associated value, if any, to the player, presents or displays the randomly generated game outcome presentation (that is retained in the gaming terminal's memory) and enables the player to play a secondary or bonus game. In the secondary or bonus game, the gaming terminal randomly generates a proposed secondary game outcome presentation based on probability data. As described above, with reference to an appropriate pay table or other stored data, the gaming terminal determines the proposed secondary game outcome associated with the proposed secondary game outcome presentation. In one embodiment, the proposed secondary game outcome presentation is independent of and not related to the game outcome provided in the primary or base game. The gaming terminal then communicates the proposed secondary game outcome to the central controller. The central controller determines if a pool of predetermined secondary game outcomes includes the proposed secondary game outcome. The central controller then proceeds with authorizing the gaming terminal to provide the player with the proposed secondary game outcome as described above regarding the primary or base game.

If the central controller determines that the pool of predetermined game outcomes does not include at least one of the proposed game outcome (or that the number of available game outcomes with the same value as the value associated with the proposed game outcome is zero), for example, each of the proposed game outcomes in the pool that have identical outcome components and identical value components as the proposed game outcome have previously been authorized to be provided to a player, the central controller does not authorize the gaming terminal to provide the proposed game outcome to the player. Rather, the central controller discards the proposed game outcome and instructs the gaming terminal to randomly generate another proposed game outcome as indicated in block 214. The gaming terminal discards the proposed game outcome presentation from its memory and randomly generates another proposed game outcome (again, identical to how a probability based gaming terminal generates a game outcome) as indicated in block 202. This proposed game outcome is communicated to the central controller for authorization and the process is repeated, as described above, until the central controller authorizes the gaming terminal to provide a proposed game outcome to the player.

In an alternative embodiment, if the central controller determines that the pool of predetermined game outcomes does not include at least one of the proposed game outcomes, the central controller may access an additional pool of predetermined game outcomes for the specific game played. In this case, the central controller will determine if this additional pool of game outcomes includes at least one of the proposed game outcomes for authorization as described above. For example, if a rare outcome (i.e., the highest possible outcome) is randomly generated by the gaming terminal and that rare outcome is not included in the pool of game outcomes because it has previously been authorized and provided to a player, the central controller may access a new pool of game outcomes and authorize the rare outcome from the new pool to be provided to the player. In another embodiment, the central controller may access the additional pool of game outcomes after the pool currently in use does not include a predetermined number of proposed game outcomes. For example, if the central controller does not authorize and discards ten proposed game outcomes (an indication that the current pool of game outcomes does not have many remaining available game outcomes), the central controller may access an additional pool of predetermined game outcomes for the specific game played. It should be appreciated that for subsequent authorizations, the central controller continues determining if the proposed game outcome is included in the first pool of outcomes and only if the proposed game outcome is not included in the first pool, will the central controller determine if the proposed game outcome is included in the additionally accessed pool of game outcomes.

In an alternative embodiment, the gaming terminal retains each rejected or discarded game outcome in a cache or other memory device. That is, if the gaming terminal receives an instruction from the central controller to randomly generate another proposed game outcome, the previous proposed game outcome is stored in the cache of rejected proposed game outcomes. In this embodiment, prior to communicated the generated proposed game outcome to the central controller, the gaming terminal determines if the proposed game outcome is included in the cache of rejected proposed game outcomes. If the cache does include the proposed game outcome, the gaming terminal discards the proposed game outcome and randomly generates another proposed game outcome. If the cache does not include the proposed game outcome, the gaming terminal communicates the proposed game outcome to the central controller for authorization as described above. As the game outcome generation and authorization must occur within a suitable amount of time, for example the few seconds that the reels of a slot machine gaming terminal are spinning, this embodiment provides that time is not wasted with multiple rejected proposed game outcomes communicated back and forth between the gaming terminal and the central controller. For example, if the gaming terminal communicates a win $25 game outcome to the central controller and the central controller responds by instructing the gaming terminal to generate another proposed game outcome, the gaming terminal will retain the win $25 game outcome in the cache of rejected proposed game outcomes. If a subsequent proposed game outcome is also a win $25 game outcome, the gaming terminal will discard the subsequent win $25 game outcome prior to communicating it to the central controller for authorization. It should be appreciated that in this embodiment, the cache of rejected proposed game outcomes is cleared by a command from the central controller when the central controller accesses a new pool of predetermined game outcomes.

In an alternative embodiment of the present invention, the central controller is operable to maintain one pool of predetermined game outcomes for a plurality of gaming terminals that are each playing a different game. That is, since the central controller authorizes a gaming terminal generated proposed game outcome and not how the game outcome is displayed or presented to the player, a plurality of gaming terminals playing a plurality of different games can each utilize the same pool for authorization of generated proposed game outcomes. For instance, as illustrated in FIG. 1B, the central controller 14 may authorize a slot machine gaming terminal 10*a* to provide a player with a slot machine gaming terminal generated win $2 outcome and simultaneously authorize a poker style gaming terminal 10*b* to provide another player with a poker style gaming terminal generated win $5 outcome. In this case, the central controller flags a win $2 outcome and a $5 win outcome in the pool of game outcomes, thus preventing the flagged game outcomes from subsequent authorizations. The slot machine gaming terminal presents or displays the game outcome presentation associated with the slot machine gaming terminal generated proposed win $2 as a specific reel symbol combination. The poker style gaming terminal presents or displays the game outcome presentation associated with the poker style gaming terminal generated proposed win $5 as a specific hand of cards. As discussed above, this embodiment enables one central controller to authorize a plurality of game outcome generated by a plurality of different gaming terminal in a casino or other entity and thus assists the casino or other entity in maintaining proper records, controlling gaming, reducing and preventing cheating or electronic or other errors and the like.

The present invention provides a number of advantages over existing central determination gaming systems. For example, since the gaming terminals of the present invention are generating game outcome presentations (that are used to determine the proposed game outcomes) in an identical manner as probability based gaming terminals, the presentation to the player is the exact same as playing a probability based gaming terminal. That is, the game outcomes are determined as in a probability based gaming terminal with the additional step, undetectable to the player, of the central controller authorizing or double checking the availability of the proposed game outcome prior to providing the generated outcome to the player. For example, in a slot machine gaming terminal, in the amount of time the reels of a probability based slot machine spin, the present invention is operable to perform the functions described above, multiple times if necessary, in order to authorize a gaming terminal generated proposed game outcome.

Furthermore, even though the central controller maintains a pool of predetermined game outcomes (which guarantees a specific amount of actual wins and losses), since the gaming terminals are generating game outcome presentations (that are used to determine the proposed game outcomes) based on probabilities, over the course of the play cycle, the game outcomes generated from the plurality of gaming terminals in the central determination gaming system will mirror a network of probability based gaming terminals in a non-central determination gaming system. That is, the present invention provides the advantage of a network of contemporary gaming terminals that determine game outcomes based on probability data while also complying with certain jurisdictional regulations that require gaming terminals which are guaranteed to provide certain or definite awards. This increases the player's level of excitement and enjoyment because the network of gaming terminals in the central determination gaming system retains the look and feel of contemporary probability based gaming terminals.

Moreover, since the gaming terminals in the present invention generate game outcomes identical to probability based gaming terminals, existing probability based gaming terminals with modified communication modules may be implemented in the present invention. That is, existing probability based gaming terminals may be used to randomly generate a game outcome and instead of the generated game outcome provided to the player (as occurs in existing probability based gaming terminals), the gaming terminal of the present invention includes an additional game state, as described above, wherein the generated game outcome is communicated to the central controller for authorization.

Figure 5:
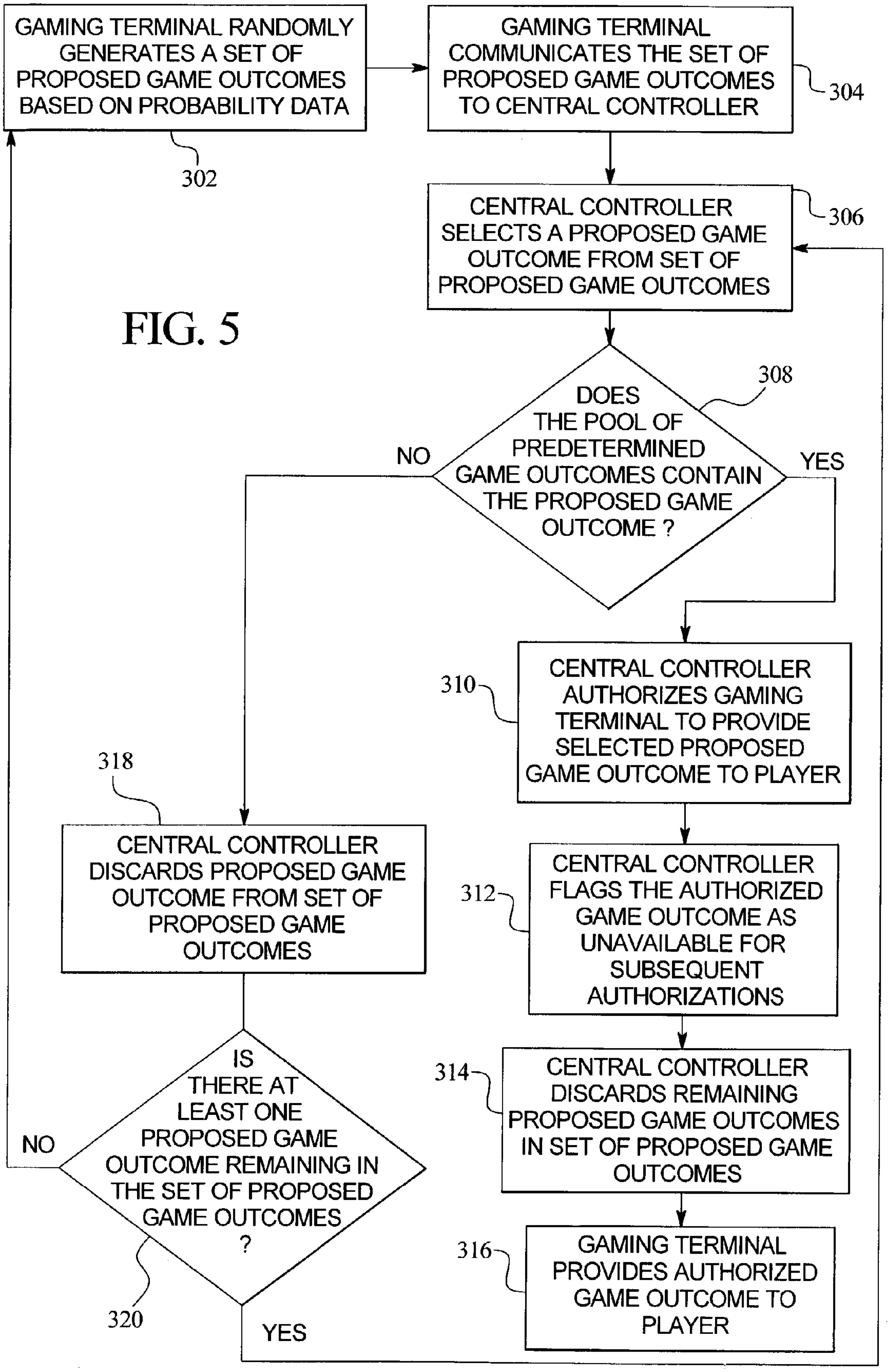
FIG. 5 is a schematic block diagram illustrating one embodiment of the present invention wherein the gaming terminal generates a set of proposed game outcomes and the set of proposed game outcomes is communicated to the central controller for authorization.

As illustrated in FIG. 5, in an alternative embodiment of the present invention, upon a player initiating a game at one of the plurality of gaming terminals, the gaming terminal randomly generates a set or plurality of proposed game outcomes as indicated in block 302. The set includes any preferable number of proposed game outcomes. As described above, each proposed game outcome is generated identical to how a game outcome is generated in a probability based gaming terminal.

The gaming terminal communicates the set of proposed game outcomes to the central controller as indicated in block 304. In an alternative embodiment, the value associated with each proposed game outcome in the set of proposed game outcomes are communicated to the player. The central controller selects one of the proposed game outcomes from the communicated set as indicated in block 306. The central controller may randomly select one of the proposed game outcomes from the set or may select the proposed game outcomes from the set in a predetermined order, such as the order the proposed game outcomes were received by the central controller or generated by the gaming terminal.

The central controller determines if the pool of predetermined game outcomes includes at least one of the selected proposed game outcomes as indicated in diamond 308. Alternatively, the central controller determines if the number of available game outcomes in the pool with the same value as the value associated with the selected proposed game outcome is at least one. If the pool of predetermined game outcomes includes at least one of the selected proposed game outcomes (or the number of available game outcomes with the same value as the value associated with the selected proposed game outcome is at least one), the central controller authorizes the gaming terminal to provide the proposed game outcome to the player as indicated in block 310. If authorized, the central controller flags the selected proposed game outcome in the pool as unavailable for subsequent authorizations as indicated in block 312.

In one embodiment, the central controller discards the non-selected proposed game outcomes in the set of proposed game outcomes as indicated in block 314. In an alternative embodiment, the central controller retains the set of non-selected proposed game outcomes. In this embodiment, the next or subsequent time a player initiates a game at the same gaming terminal or another gaming terminal utilizing the same pool of game outcomes, the gaming terminal randomly generates and communicates to the central controller a partial set of game outcomes for authorization. For example, upon a first game played, the gaming terminal may discard four proposed game outcomes from a generated set of ten proposed game outcomes prior to authorizing the gaming terminal to provide a proposed game outcome to the player. In the next game played, the gaming terminal would randomly generate five proposed game outcomes (to replace the four discarded game outcomes and the one authorized game outcome) and communicate the five generated game outcomes to the central controller.

If the authorized game outcome is a win outcome or a lose outcome, the gaming terminal displays the game outcome presentation to the player and provides the authorized game outcome and the associated value, if any, to the player as indicated in block 316. If the authorized game outcome is a secondary game triggering outcome (not shown), the gaming terminal provides the associated value, if any, to the player and enables the player to play a secondary or bonus game. As described above, even though the gaming terminal enables the player to player a secondary or bonus game, the secondary game outcome has already been determined and authorized along with the primary game outcome. That is, the gaming terminal does not communicate with the central controller regarding the secondary game outcome but rather provides the prior authorized secondary game outcome and presents the prior generated secondary game outcome presentation to the player.

If the central controller determines that the pool of predetermined game outcomes does not include at least one of the selected proposed game outcome (or that the number of available game outcomes with the same value as the value associated with the selected proposed game outcome is zero), the central controller discards the selected proposed game outcome from the set of proposed game outcomes as indicated in block 318. The central controller then determines if there is at least one proposed game outcome remaining in the set of proposed game outcomes as indicated in diamond 320.

If there is at least one remaining proposed game outcome in the set of proposed game outcomes, the central processor selects another proposed game outcome from the set of game outcomes as indicated in block 306. This process continues as described above until the central controller authorizes the gaming terminal to provide a selected proposed game outcome to the player.

If there are no remaining proposed game outcomes in the set of proposed game outcomes, the central controller instructs the gaming terminal to randomly generate another set of proposed game outcomes as indicated in block 302. As described above, each proposed game outcome in this set is randomly generated based on probability data. This set of proposed game outcomes is communicated to the central controller for authorization and the process is repeated as described above until the central controller authorizes the gaming terminal to provide a selected proposed game outcome to the player.

In an alternative embodiment wherein the gaming terminal communicates a plurality of proposed game outcomes to the central controller, the central controller determines if the pool of predetermined game outcomes includes each communicated proposed game outcome. In this embodiment, each proposed game outcome that is included in the pool of predetermined game outcomes is authorized, flagged and then stored in a cache or other memory storage device of the central controller. Each proposed game outcome that is not included in the pool of predetermined game outcomes is discarded. The central controller then randomly or sequentially selects one of the authorized game outcomes, removes the selected game outcome from the cache and communicates the authorized game outcome to the gaming terminal to be provided to the player. On the next or subsequent game play from the same gaming terminal or another gaming terminal utilizing the same pool of game outcomes, the gaming terminal does not determine and communicate a plurality of proposed game outcomes to the central controller, but rather the central controller randomly or sequentially selects another game outcome from the cache of authorized game outcomes, removes the selected game outcome from the cache and communicates the authorized game outcome to the gaming terminal to be provided to the player. This process continues as described above until the cache of authorized game outcomes is empty at which time the central controller instructs the gaming terminal to randomly generate another plurality of proposed game outcomes to be communicated to the central controller as described above.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A central determination gaming system comprising:

a pool of predetermined game outcomes; and a central controller operable to:

(a) store said pool of game outcomes, and (b) for each play of a primary wagering game at a gaming terminal:

(i) to receive a proposed game outcome from the gaming terminal after a player makes a wager on the primary wagering game at said gaming terminal, wherein said proposed game outcome is for said primary wagering game, (ii) to determine if said pool of game outcomes includes an available game outcome based on said proposed game outcome, (iii) to authorize said proposed game outcome, (iv) to prevent said authorized game outcome from further authorization from said pool, and (v) to output said authorized game outcome to said gaming terminal.

2. The central determination gaming system of claim 1, which includes a plurality of pools of game outcomes wherein said central controller is operable to determine if any of said pools include said game outcome based on said proposed game outcome.

3. The central determination gaming system of claim 1, wherein said central controller is operable to receive a plurality of proposed game outcomes from said gaming terminal and to determine if said pool of game outcomes includes a plurality of game outcomes based on said plurality of proposed game outcomes.

4. The central determination gaming system of claim 1, wherein said central controller is operable to receive a proposed game outcome from each of a plurality of gaming terminals.

5. The central determination gaming system of claim 1, wherein said central controller is operable to discard said proposed game outcome if said pool of game outcomes does not include said game outcome based on said proposed game outcome.

6. The central determination gaming system of claim 5, wherein said central controller is operable to request at least one additional proposed game outcome if said pool of game outcomes does not include said game outcome based on said proposed game outcome.

7. A central determination gaming system comprising:

a pool of predetermined game outcomes; and a central controller operable to:

(a) store said pool of game outcomes, and (b) for each play of a primary wagering game at a gaming terminal:

(i) to receive at least one proposed game outcome from the gaming terminal after a player makes a wager on the primary wagering game, wherein said proposed game outcome is for said primary wagering game, (ii) to determine if said pool of game outcomes includes an available game outcome based on said proposed game outcome, (iii) to authorize said proposed game outcome if said pool includes said available game outcome based on said proposed game outcome, (iv) to prevent said authorized game outcome from further authorization from said pool, and (v) to communicate said authorized game outcome to said gaming terminal, wherein said gaming terminal includes a display device and a processor in communication with said central controller operable to enable the player to initiate the primary wagering game, to randomly generate said proposed game outcome for said primary wagering game, to communicate said proposed game outcome to said central controller for each play of the primary wagering game and to provide said authorized game outcome to the player.

8. The central determination gaming system of claim 7, which includes a plurality of pools of predetermined game outcomes wherein said central controller is operable to determine if any of said pools include said game outcome based on said proposed game outcome.

9. The central determination gaming system of claim 7, wherein said central controller is operable to receive a proposed game outcomes from each of a plurality of gaming terminals.

10. The central determination gaming system of claim 7, wherein said processor of said gaming terminal randomly generates a proposed game outcome presentation based on probability data.

11. The central determination gaming system of claim 10, wherein said processor of the gaming terminal determines said proposed game outcome based on said proposed game outcome presentation.

12. The central determination gaming system of claim 10, wherein said game outcome presentation is presented to the player when said authorized game outcome is provided to the player.

13. The central determination gaming system of claim 7, wherein said central controller is operable to request at least one additional proposed game outcome from said gaming terminal, if said pool of game outcomes does not include said available game outcome based on said proposed game outcome.

14. A central determination gaming system comprising:

a pool of predetermined game outcomes;

a central controller operable to store said pool of game outcomes, to receive at least one proposed game outcome after a player makes a wager on a primary wagering game wherein said proposed game outcome is for said primary wagering game, to determine if said pool of game outcomes includes an available game outcome based on said proposed game outcome, to authorize said proposed game outcome if said pool includes said game outcome based on said proposed game outcome, to prevent said authorized game outcome from further authorization from said pool and to output said authorized game outcome; and at least one gaming terminal including a display device, a storage device and a processor operable to enable the player to initiate said primary wagering game, to randomly generate said proposed game outcome for said primary wagering game, to communicate said proposed game outcome to said central controller for each play of the primary wagering game and to provide said authorized game outcome to the player.

15. The central determination gaming system of claim 14, which includes a plurality of pools of predetermined game outcomes wherein said central controller is operable to determine if any of said pools include said game outcome based on said proposed game outcome.

16. The central determination gaming system of claim 14, wherein said central controller is operable to receive a proposed game outcome from each of a plurality of gaming terminals.

17. The central determination gaming system of claim 14, wherein said processor of said gaming terminal randomly generates a proposed game outcome presentation based on probability data.

18. The central determination gaming system of claim 17, wherein said processor of the gaming terminal determines said proposed game outcome based on said proposed game outcome presentation.

19. The central determination gaming system of claim 17, wherein said processor of the gaming terminal stores said game outcome presentation when said proposed game outcome is communicated to the central controller.

20. The central determination gaming system of claim 19, wherein said stored game outcome presentation is presented to the player when said authorized game outcome is provided to the player.

21. The central determination gaming system of claim 20, wherein said stored game outcome presentation is discarded if said proposed game outcome is not provided to the player.

22. The central determination gaming system of claim 14, wherein said central controller is operable to discard said proposed game outcome if said central controller determines that said pool of game outcomes does not include said game outcome based on said proposed game outcome.

23. The central determination gaming system of claim 19, wherein said central controller is operable to instruct said gaming terminal to randomly generate at least one additional proposed game outcome, if said pool of game outcomes does not include said game outcome based on said proposed game outcome.

24. A central determination gaming system comprising:

a pool of predetermined game outcomes; and a central controller operable to store said pool of game outcomes, to receive a plurality of proposed game outcomes from a gaming terminal after a player makes a wager on a play of a primary wagering game at said gaming terminal wherein said proposed game outcomes are for said primary wagering game, to select one of said proposed game outcomes, to determine if said pool of game outcomes includes an available game outcome based on said selected proposed game outcome, to authorize said selected proposed game outcome if said pool of game outcomes includes said game outcome based on said selected proposed game outcome, to prevent said authorized game outcome from further authorization from said pool and to output said authorized proposed game outcome to said gaming terminal.

25. The central determination gaming system of claim 24, wherein said central controller is operable to receive a plurality of proposed game outcomes from each of a plurality of gaming terminals.

26. The central determination gaming system of claim 24, wherein said central controller is operable to discard said selected proposed game outcome if said pool of game outcomes does not include said game outcome based on said selected proposed game outcome.

27. The central determination gaming system of claim 26, wherein said central controller is operable to select another proposed game outcome from said plurality of proposed game outcomes, if said pool of game outcomes does not include said game outcome based on said selected proposed game outcome.

28. The central determination gaming system of claim 24, wherein said central controller is operable to request another plurality of proposed game outcomes, if said pool of game outcomes does not include said game outcome based on said selected proposed game outcome.

29. The central determination gaming system of claim 24, wherein said central controller is operable to select each of said proposed game outcomes in said plurality of proposed game outcomes and to store said authorized proposed game outcomes for subsequent wagering games at said gaming terminal.

30. A central determination gaming system comprising:

a pool of predetermined game outcomes; and a central controller operable to store said pool of game outcomes, to receive a plurality of proposed game outcomes from a gaming terminal after a player makes a wager on a play of a primary wagering game wherein said proposed game outcomes are for said primary wagering game, to select a proposed game outcome from said plurality of proposed game outcomes, to determine if said pool of game outcomes includes a game outcome based on selected proposed game outcome, to authorize said selected proposed game outcome if said pool includes said game outcome based on said selected proposed game outcome, to prevent said authorized game outcome from further authorization from said pool and to communicate said authorized game outcome to said gaming terminal, wherein said gaming terminal includes a display device and a processor in communication with said central controller operable to enable the player to initiate the wagering game, to randomly generate said plurality of proposed game outcomes for said primary wagering game, to communicate said plurality of proposed game outcomes to said central controller and to provide said authorized game outcome to the player.

31. The central determination gaming system of claim 30, which includes a plurality of pools of predetermined game outcomes wherein said central controller is operable to determine if any of said pools include said game outcome based on said selected proposed game outcome.

32. The central determination gaming system of claim 30, wherein said central controller is operable to receive a plurality of proposed game outcomes from each of a plurality of gaming terminals.

33. The central determination gaming system of claim 30, wherein said processor of said gaming terminal randomly generates a proposed game outcome presentation based on probability data.

34. The central determination gaming system of claim 33, wherein said processor of the gaming terminal determines said proposed game outcome based on said proposed game outcome presentation.

35. The central determination gaming system of claim 33, wherein said game outcome presentation is presented to the player when said authorized game outcome is provided to the player.

36. The central determination gaming system of claim 30, wherein said central controller is operable to discard said selected proposed game outcome if said central controller determines that said pool of game outcomes does not include said game outcome based on said proposed game outcome.

37. The central determination gaming system of claim 36, wherein said central controller is operable to select another proposed game outcome from said plurality of proposed game outcomes, if said pool of game outcomes does not include said game outcome based on said selected proposed game outcome.

38. The central determination gaming system of claim 36, wherein said central controller is operable to instruct said gaming terminal to randomly generate another plurality of proposed game outcomes, if said pool of game outcomes does not include said game outcome based on said selected proposed game outcome.

39. A gaming terminal comprising:

a primary wagering game operable upon a wager by a player;

a display device; and a processor in communication with said display device operable to enable the player to initiate the wagering game, to determine a proposed game outcome for said primary wagering game, to communicate said proposed game outcome to a central controller for each play of the primary wagering game, to receive an authorization from said central controller to provide said proposed game outcome for each play of the primary wagering game and to provide said authorized game outcome to the player.

40. The gaming terminal of claim 39, wherein said processor randomly generates a proposed game outcome presentation based on probability data.

41. The gaming terminal of claim 40, wherein said processor determines said proposed game outcome based on said proposed game outcome presentation.

42. The gaming terminal of claim 40, wherein said game outcome presentation is presented to the player when said authorized game outcome is provided to the player.

43. The gaming terminal of claim 39, wherein each game outcome is a win outcome, a lose outcome or a secondary game triggering outcome.

44. The gaming terminal of claim 43, wherein said processor is operable to determine a proposed secondary game outcome if said proposed game outcome is said secondary game triggering outcome.

45. The gaming terminal of claim 44, wherein said processor is operable to communicate said proposed game outcome and said proposed secondary game outcome to the central controller.

46. The gaming terminal of claim 39, wherein said processor is operable to retain said proposed game outcome in a cache of unavailable game outcomes, if said process does not receive an authorization from said central controller for said communicated proposed game outcome.

47. The gaming terminal of claim 46, wherein said processor is operable to determine if said proposed game outcome is stored in said cache of unavailable game outcomes and discard said proposed game outcome if said proposed game outcome is stored in said cache of unavailable game outcomes.

48. The gaming terminal of claim 39, wherein said processor is operable to determine another proposed game outcome if said central controller does not authorize said communicated proposed game outcome.

49. A gaming terminal comprising:

a primary wagering game operable upon a wager by a player;

a display device; and a processor in communication with said display device operable to enable the player to initiate the primary wagering game, to determine a plurality of proposed game outcomes for a play of said primary wagering game, to communicate said determined set of proposed game outcomes to a central controller, to receive an authorization from said central controller to provide one of said proposed game outcomes from said set of game outcomes and to provide said authorized game outcome to the player.

50. The gaming terminal of claim 49, wherein said processor randomly generates a plurality of proposed game outcome presentations based on probability data.

51. The gaming terminal of claim 50, wherein said processor determines said plurality of proposed game outcomes based on said plurality of proposed game outcome presentations.

52. The gaming terminal of claim 49, wherein said processor is operable to determine another plurality of proposed game outcome if said central controller does not authorize at least one of said communicated proposed game outcomes.

53. A method of operating a central determination gaming system, said method comprising the steps of:

(a) for each play of a primary wagering game receiving a proposed game outcome for the primary wagering game from a gaming terminal after a player makes a wager on said primary game at said gaming terminal;

(b) determining if a pool of game outcomes includes a game outcome based on said proposed game outcome;

(c) authorizing said gaming terminal to provide said proposed game outcome to the player, if said pool of game outcomes includes said game outcome based on said proposed game outcome;

(d) preventing said authorized game outcome from a subsequent authorization from said pool, if said pool of game outcomes includes said game outcome based on said proposed game outcome;

(e) discarding said proposed game outcome, if said pool of game outcomes does not include said game outcome based on said proposed game outcome;

(f) providing an instruction to said gaming terminal to randomly generate another proposed game outcome, if said pool of game outcomes does not include said game outcome based on said proposed game outcome; and (g) repeating steps (a) through (f) at least once if said pool of game outcomes.

54. The method of claim 53, which is operated through a data network.

55. The method of claim 54, wherein the data network includes an internet.

56. A method of operating a central determination gaming system, said method comprising the steps of:

(a) receiving a set of a plurality of proposed game outcomes for a play of a primary wagering game from a gaming terminal after a player makes a wager on said primary wagering game at said gaming terminal;

(b) selecting one of said proposed game outcomes from said set;

(c) determining if a pool of game outcomes includes a game outcome based on said selected proposed game outcome;

(d) authorizing said gaming terminal to provide said selected proposed game outcome to the player, if said pool of game outcomes includes the game outcome based on said proposed game outcome;

(e) preventing said proposed game outcome from a subsequent authorization from said pool, if said pool of game outcomes includes said game outcome based on said proposed game outcome;

(f) discarding said proposed game outcome, if said pool of game outcomes does not include said game outcome based on said proposed game outcome;

(g) determining if said set of game outcomes includes at least one remaining proposed game outcome;

(h) repeating steps (b) to (g), if said set of game outcomes includes at least one remaining proposed game outcome;

(i) providing an instruction to said gaming terminal to randomly generate another set of a plurality of proposed game outcomes, if said set of game outcomes does not include at least one remaining proposed game outcome; and (j) repeating steps (a) through (j) at least once, if said pool of game outcomes does not include a game outcome based on said proposed game outcome.

57. The method of claim 56, which is operated through a data network.

58. The method of claim 57, wherein the data network includes an internet.

59. A method of operating a gaming terminal, said method comprising the steps of:

(a) enabling a player to initiate a primary wagering game;

(b) randomly generating a proposed game outcome presentation for said primary wagering game;

(c) determining a proposed game outcome based on said proposed game outcome presentation;

(d) communicating said proposed game outcome to a central controller for each play of the primary wagering game;

(e) determining if said central controller authorized said proposed game outcome;

(f) providing said proposed game outcome to the player if said central controller authorized said proposed game outcome; and (g) repeating steps (b) to (f), if said central controller did not authorize said proposed game outcome.

60. The method of claim 59, which is operated through a data network.

61. The method of claim 60, wherein the data network includes an internet.

* * * * *